(12) United States Patent
Wilkinson

(10) Patent No.: US 11,644,295 B2
(45) Date of Patent: *May 9, 2023

(54) METROLOGY DEVICE WITH AUTOMATED COMPENSATION AND/OR ALERT FOR ORIENTATION ERRORS

(71) Applicant: The L.S. Starrett Company, Athol, MA (US)

(72) Inventor: Jeffrey M. Wilkinson, Littleton, MA (US)

(73) Assignee: The L.S. Starrett Company, Athol, MA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/460,606

(22) Filed: Aug. 30, 2021

(65) Prior Publication Data

US 2021/0389111 A1 Dec. 16, 2021
US 2021/0389111 A1 Dec. 16, 2021

Related U.S. Application Data

(63) Continuation of application No. 16/277,096, filed on Feb. 15, 2019, now Pat. No. 11,105,605.

(Continued)

(51) Int. Cl.
*G01B 5/20* (2006.01)
*G01C 9/06* (2006.01)

(52) U.S. Cl.
CPC ............... *G01B 5/20* (2013.01); *G01C 9/06* (2013.01)

(58) Field of Classification Search
None
See application file for complete search history.

(56) References Cited

U.S. PATENT DOCUMENTS 4,912,662 A 3/1990 Butler et al.
4,945,501 A * 7/1990 Bell .................... G01B 21/045
318/632

(Continued)

FOREIGN PATENT DOCUMENTS

JP 2008309687 12/2008
WO WO-2015016760 A1 * 2/2015 ............... G01B 3/22

OTHER PUBLICATIONS

International Search Report and Written Opinion dated Apr. 24, 2019 in corresponding PCT Patent Application No. PCT/US19/18204.

(Continued)

*Primary Examiner* — Christopher W Fulton
(74) *Attorney, Agent, or Firm* — Grossman, Tucker, Perreault & Pfleger, PLLC

(57) ABSTRACT

A metrology device with automated compensation and/or alert for orientation errors. The device may include a processor, a probe portion and at least one orientation sensor. The probe provides an output representative of a raw measurement of a characteristic of a device under test and the orientation sensor provides a sensor output representative of an orientation of the metrology device to the device under test. The processor applies a correction factor to the raw measurement in response to the sensor output to establish a compensated measurement to compensate for misalignment of the metrology device to the device under test. In addition, or alternatively, the processor provides an alert indicating the existence and/or extent of the misalignment.

9 Claims, 4 Drawing Sheets

Related U.S. Application Data

(60) Provisional application No. 62/631,939, filed on Feb. 18, 2018.

(56) References Cited

U.S. PATENT DOCUMENTS

| | | | | |
|---|---|---|---|---|
| 5,373,222 | A * | 12/1994 | Hemmerle | G01B 11/26 318/572 |
| 6,619,141 | B2 | 9/2003 | Danninger | |
| 7,392,692 | B2 * | 7/2008 | Noda | G01B 5/008 73/104 |
| 8,978,263 | B2 | 3/2015 | Nahum et al. | |
| 10,041,779 | B2 * | 8/2018 | Masuta | G01B 5/201 |
| 11,105,605 | B2 * | 8/2021 | Wilkinson | G01B 3/56 |
| 2003/0204361 | A1 | 10/2003 | Townsend et al. | |
| 2014/0033554 | A1 | 2/2014 | Nahum et al. | |
| 2014/0283402 | A1 * | 9/2014 | Hidaka | G01B 5/28 33/556 |
| 2015/0187101 | A1 | 7/2015 | Maayan et al. | |
| 2016/0231150 | A1 | 8/2016 | Terauchi | |
| 2021/0156659 | A1 * | 5/2021 | Zhong | G01B 3/22 |

OTHER PUBLICATIONS

Extended Search Report in related European Application No. 19753991.9, dated Nov. 3, 2021.

* cited by examiner

METROLOGY DEVICE WITH AUTOMATED COMPENSATION AND/OR ALERT FOR ORIENTATION ERRORS

CROSS REFERENCE TO RELATED APPLICATIONS

The present application is a continuation of U.S. patent application Ser. No. 16/277,096, filed Feb. 15, 2019, now U.S. Pat. No. 11,105,605, which claims the benefit of the filing date of U.S. Provisional Application Ser. No. 62/631,939, filed Feb. 18, 2018, the entire disclosures of which applications are hereby incorporated herein by reference.

TECHNICAL FIELD

The present application relates to metrology devices and, in particular, to a metrology device with automated compensation and/or alert for orientation errors.

BACKGROUND

A variety of metrology devices are known for use in making measurements with very high accuracy. In general, such devices include one or more probes that move in response to a measured characteristic. The probe may be, for example, a plunger, lever arm, contact, etc. Portable handheld indicators, for example, may be used to accurately measure small distances and/or angles (e.g. to check the variation in tolerance during inspection of a machined part) and amplify them to make them more obvious by indicating the measurement on an analog or digital display or dial for viewing by a user. Types of indicators include, for example, plunger indicators and lever arm indicators. In a plunger indicator the probe is configured as a plunger that moves perpendicularly to the device under test by either retracting or extending from the indicator body. In a lever arm indicator, the probe is configured as a lever arm that swings in an arc about a pivot point.

One challenge associated with use of metrology devices relates to proper orientation of the metrology device to the surface to be measured on the device under test. For some metrology devices, the contact angle of the probe must be parallel or perpendicular to the surface being measured in order for the measurement to be truly accurate. In other words, the path of the probe movement must coincide with the vector that is being measured. Misalignment of the path of the probe movement and the vector that is being measured leads to inaccurate measurement. The pitch, yaw and/or roll of the device can each contribute an orientation error impacting the accuracy of the measurement produced by the metrology device.

For example, a lever arm indicator having a lever arm that is not parallel to the device under test effectively increases the travel of the probe as it is now increasing the probe travel by using the longer member, the hypotenuse, of a triangle in which the desired vector is one of the legs. To obtain an accurate measurement the measurement shown on the device must be multiplied by the cosine of the angle of the lever arm to the surface being measured. The error in measurement is thus known as a "cosine error."

Cosine error may be understood, for example, with reference to FIG. 1, which is a side view of one example of a lever arm indicator 100 including dial 102 and a probe 104 positioned at an angle θ to a surface to be measured 106. If the value on the dial 102 shows 0.200 mm and the probe 104 is at an angle θ of 33°, the reading on the dial 102 is inaccurate due to a cosine error. To obtain the accurate measurement in this example, the reading on the dial 102 must be multiplied by the cosine of 33° (the angle θ in this example), which is 0.83867. The resulting corrected measurement is 0.16773 mm, which is significantly different from the reading on the dial 102 of 0.200 mm.

Compounding this problem is that it is not always a simple matter to set and identify the orientation the device to the surface to be measured, especially in cases where the device is used in a tight space. Even when the device is known to be misaligned, identifying the extent of misalignment can be difficult. This makes it very difficult to compensate for orientation errors, even when the orientation error is known to exist.

Figure 1:
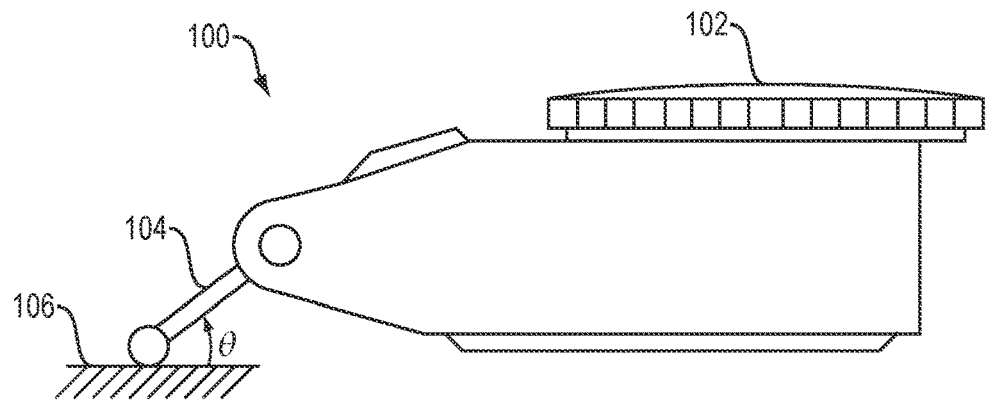
FIG. 1 illustrates a metrology device with cosine error.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

In embodiments consistent with the disclosure a metrology device may be configured to provide automated compensation for orientation errors and/or an automated alert of the existence and/or extent of orientation errors. An "orientation error" refers to misalignment of the metrology device to the device under test (DUT). Orientation errors result in an inaccuracy of the measurement shown on a metrology device, e.g. on a dial or display of the device. Cosine error is one example of an orientation error. A sine error is another example of an orientation error and is similar to cosine error, except that compensation is achieved by multiplying a raw measurement by the sine of the angle of the device to the DUT. Orientation errors may result from improper pitch, roll and/or yaw of the metrology device to the DUT and/or an improper probe angle between a probe of the metrology device and the DUT.

In general, a metrology device consistent with the present disclosure includes one or more orientation sensors for determining the orientation of the device relative to the DUT. Each orientation sensor provides one or more associated sensor outputs to a processor of the device. To provide automated compensation for orientation errors, the processor calculates a compensation factor in response to the sensor output(s) and provides an output to a digital display of the device to display a measurement including compensation for detected orientation error(s). In addition, or alternatively, in response to the sensor output(s) the processor may be configured to provide an automated alert of the existence and/or extent of orientation errors and display the extent of orientation error. The alert may assist a user in orienting the device to the DUT to reduce orientation error.

Figure 2:
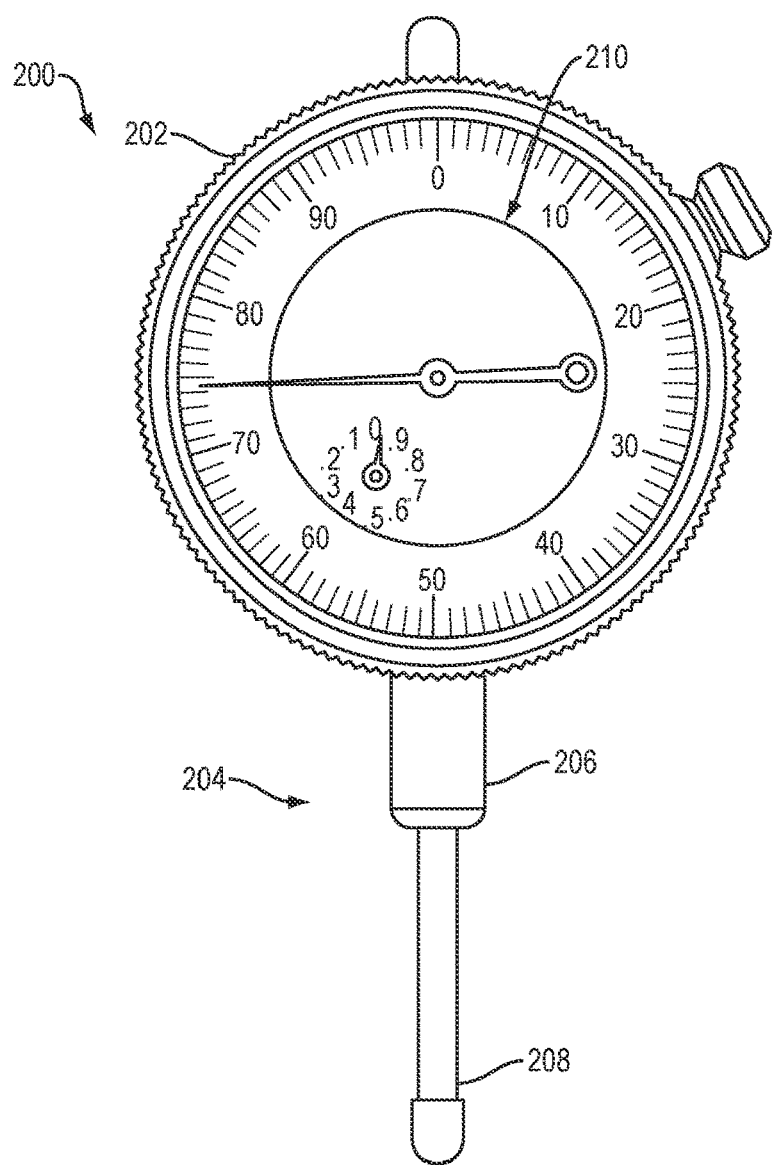
FIG. 2 illustrates one example of a metrology device consistent with the present disclosure.

FIG. 2 diagrammatically illustrates one example of a metrology device 200 in accordance with the present disclosure. The illustrated example device is configured as a plunger indicator and includes a housing portion 202, a probe portion 204 and a display 210. The probe portion 204 includes a probe body 206 and a plunger 208 that is intended to move perpendicularly to the device under test (DUT) by either retracting or extending from the probe body 206. The probe tip 204 is configured to engage a device under test (DUT) and, in response to movement of the probe tip 204, the probe portion 204 provides a probe output representative of a raw measurement of a characteristic, e.g. dimension, orientation, etc. of the DUT. In some embodiments, the probe output from the probe portion 204 may be an electronic output, and in other embodiments the output from the probe portion 204 may be a mechanical output.

The device 200 may include at least one orientation sensor (not shown in FIG. 2) configured to provide a sensor output representative of an orientation of at least a portion of the metrology device to the DUT. A processor disposed within the housing 202 is configured to receive the probe output and the sensor output and apply a correction factor to the raw measurement in response to the sensor output to establish a compensated measurement to compensate for misalignment of the metrology device 200 to the DUT. The processor is configured to provide an output to the display 210 for providing a visual representation of the compensated measurement on the digital display 210.

In addition, or alternatively, in response to the sensor output the processor may provide an audible and/or visual alert to a user indicating that the device is misaligned to the DUT. In some embodiments the alert may include an audible and/or visual indication of the extent of misalignment of the device to the DUT. This allows a user to manually adjust for the misalignment to the DUT to obtain an accurate measurement from the device 200 without compensation. In embodiments where the device provides an alert without providing a representation of the compensated measurement on the display 210, the processor may be configured to provide the alert and/or the extent of the misalignment in response to the sensor output without applying a correction factor.

Although the illustrated exemplary embodiment includes a metrology device 200 of a specific configuration, embodiments consistent with the present disclosure may be provided in a wide variety of configurations for use in a wide variety of metrology applications. For example, a metrology device consistent with the present disclosure may include any of a variety of probe types, e.g., a plunger, lever arm, contact, contact pair, contact and reference datum, rotating member or other variable moving member of the device. Also, in some embodiments a device consistent with the present disclosure may be a portable hand-held device.

Figure 3:
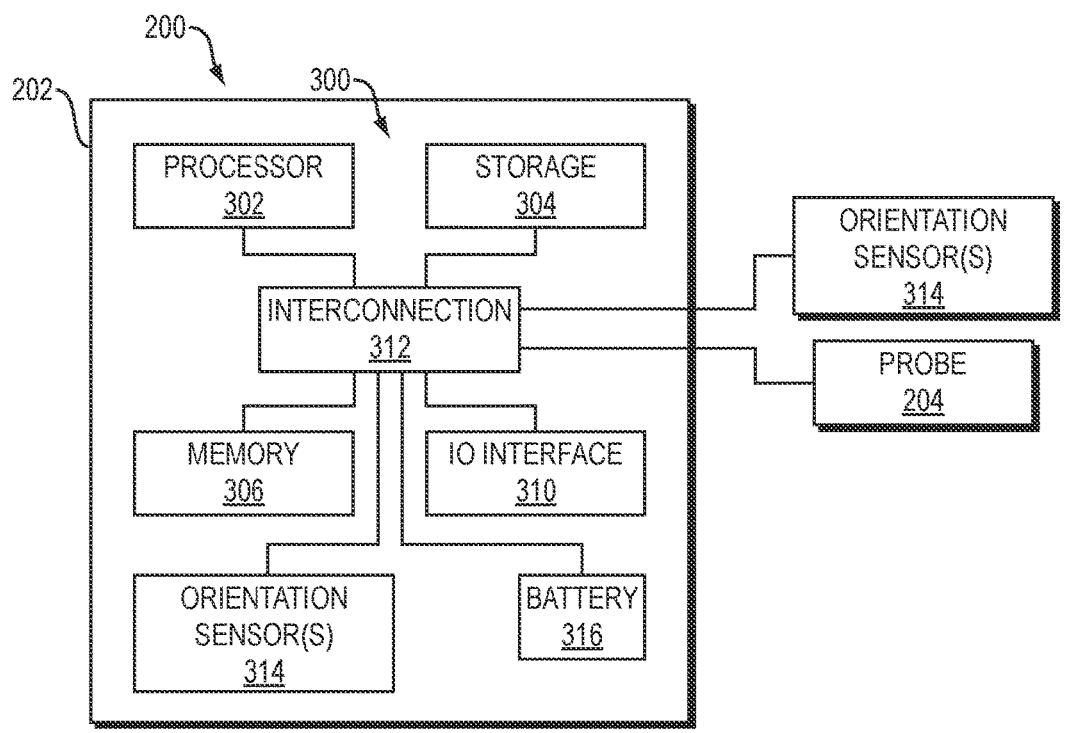
FIG. 3 is a block diagram showing components of an example of a metrology device consistent with the present disclosure.

FIG. 3 is a block diagram of the components of the metrology device 200 consistent with the present disclosure. As shown, the device 200 includes a computing system 300 disposed at least partially within the housing 202. The computing system 300 includes a processor 302, a data storage device 304, a memory 306, an IO interface 310, interconnection element 312 and a battery 316. The battery 316 may be included in the housing 202 for supplying electrical power to the computing system 300. The battery 316 may be a rechargeable battery, such as a lithium ion battery.

To execute at least some aspects provided herein, the processor 302 receives and performs a series of instructions that result in the execution of routines and manipulation of data, e.g. using an operating system. For example, the operating system may be a mobile operating system (e.g., an iOS Apple or Android device operating system). In other examples, the computing system 300 may implement a compact form of Windows®, Android or Mac OS® operating system. Many other operating systems may be used, and examples are not limited to any particular operating system.

In some cases, the processor 302 is at least two processors. In some such cases, the processor 302 may be multiple processors or a processor with a varying number of processing cores. The memory 306 may be random access (RAM) and configured to store sequences of instructions and other data used during the operation the device, e.g. the operating system and/or other application programs. To this end, the memory 306 may be a combination of volatile and non-volatile memory such as dynamic random-access memory (DRAM), static memory (SRAM), or flash memory, etc.

The storage device 304 includes any computer readable and writable non-transitory storage medium. The storage device 304 may have a sequence of instructions stored thereon that define one or more application programs that may be executed by the processor 302. In addition, the storage device 304 may generally store data in contiguous and non-contiguous data structures within a file system of the storage device 304. During operation, the processor 302 may cause data in the storage device 304 to be moved to a memory device, such as the memory 306, allowing for faster access.

The IO interface 310 may be any number of components capable of data input and and/or output. Such components may include, for example, a display 210, e.g. a digital display such as a touch screen display, a microphone for receiving voice commands, speakers, mechanical buttons, switches, simple or multi-touch gestures by touching the screen with styli or one or more fingers, etc. In some embodiments, the display 210 may be coupled to the housing 202 to be visible on a surface of the device 200. In addition, or alternatively, the display 210 may be positioned remotely from the housing 202 and coupled to the device 200 through a wired or wireless connection. The IO interface 310 may also include features and settings enabling exchange of data with another computer or mobile device over a wireless link and/or via cabled connection. The interconnection element 312 may comprise any communication channel/bus between components of the computing system 300 and operate in conformance with standard communications link protocols such as; SPI, I²C, RS232, USB among others.

In addition to the computing system 300, one or more orientation sensors 314 may be disposed within the housing 202 and/or outside of the housing 202, e.g. on or within the probe 204. The orientation sensors 314 are configured to provide sensor outputs representative of the orientation (e.g. pitch, roll, yaw and/or probe angle) of the device 200 to the DUT. The orientation sensor(s) may include known variable resistive elements, angle sensors, accelerometers, tilt sensors, magnetometers and/or gyroscopes.

The sensor outputs of the orientation sensors 314 may be provided to the processor 302 along with the probe output of the probe 204. To provide automated compensation for orientation errors, the processor 302 may receive the output of the probe and apply a compensation factor to the measurement represented by the probe output to in response to the sensor output(s) of the orientation sensor(s) 314. The processor 302 may provide an output to the digital display for providing a visual representation of the compensated measurement on the digital display 210. In addition, or alternatively, the processor 302 may provide an alert in response to the sensor output(s) to alert a user that the metrology device 200 is misaligned to the DUT. The alert may indicate the extent of the misalignment to allow the user to manually align the metrology device 200 to the DUT.

Figure 4:
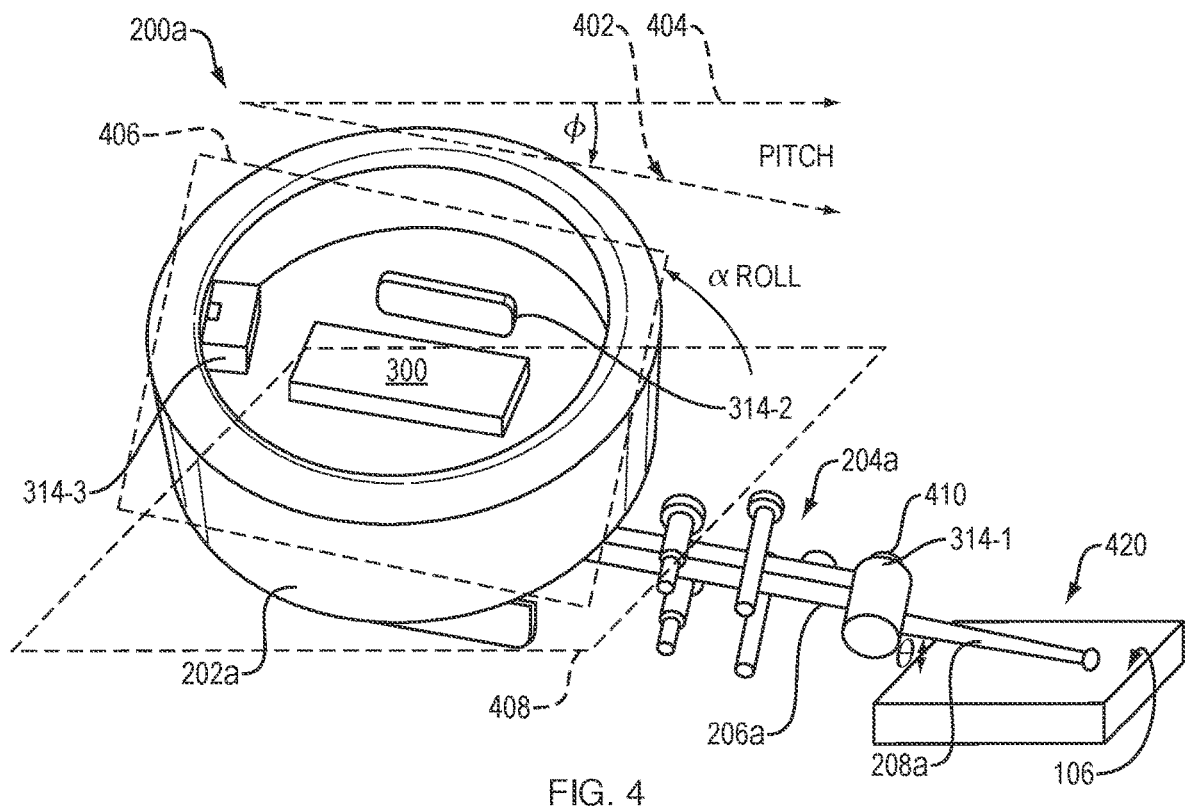
FIG. 4 illustrates another example of a metrology device consistent with the present disclosure showing a compound orientation error relative to a device under test.

FIG. 4 diagrammatically illustrates another example of a metrology device 200a in accordance with the present disclosure. In the illustrated embodiment, the device 200a is shown with the display removed to illustrate components within the housing of the device 200a. The device 200a is configured as a lever arm indicator with a lever arm probe 204a and is shown in FIG. 4 with compound orientation errors relative to the DUT 420. In particular, the device 200a has a pitch $\Phi$, roll $\alpha$ and probe angle $\theta$ relative to the surface to be measured 106. In the illustrated example, the pitch $\Phi$ of the device 200a is shown as the angle between a line 402 parallel with the face of device to a line 404 parallel with the surface to be measured 106, and the roll $\alpha$ of the device is shown as the angle between a plane 406 bisecting the width of the device 200a to a plane 408 parallel with the surface to be measured 106 on the DUT 420. The device 200a includes a pivot joint 410 connecting the probe tip 208a to the probe body 206a so that the angle of the probe tip 208a relative to the probe body 206a may be modified. In the illustrated example embodiment, both the angle of the probe tip 208a and the pitch $\Phi$ of the device 200a contribute to the probe angle $\theta$.

To detect orientation errors relative to the DUT 420, the example embodiment shown in FIG. 4 includes a first orientation sensor 314-1, a second orientation sensor 314-2 and a third orientation sensor 314-3. The first sensor 314-1 is positioned outside of the housing 202a and is coupled to the pivot joint 410 connecting the probe tip 208a to the probe body 206a at the pivot joint 410 and the second 314-2 and third 314-3 sensors are disposed in the housing 202a. It is to be understood, however, that any or all of the sensors may be disposed inside or outside of the housing as one integrated sensor package or as discrete and separate sensors placed in the tool.

All the sensors 314-1, 314-2, 314-3 produce one or more associated sensor outputs coupled to the computing system 300. Each of the sensor outputs is representative of one or more of the pitch $\Phi$, roll $\alpha$, yaw or probe angle $\theta$ of the device 200a relative to the surface to be measured 106 on the DUT 420. The computing system 300 receives the sensor output(s) along with a probe output from the probe representative of a raw measurement of a characteristic of the surface to be measured on the DUT. The computing system calculates a compensation factor in response to the sensor outputs and applies the compensation factor to the raw measurement represented by the output from the probe 204a to produce compensated measurement that compensates for misalignment of the device relative to the DUT. The processor 302 provides an output to the display 210 to provide a visual representation of the compensated measurement on the display 210. The device may thus automatically compensate for compound orientation errors. Additionally, or alternatively, the compensation factor can be determined by, or augmented by, arithmetic factors, derating, offsets and/or other criteria. In addition, or alternatively, the processor 302 may provide an alert in response to the sensor output(s) to alert a user that the metrology device 200a is misaligned to the DUT. The alert may indicate the extent of the misalignment to allow the user to manually align the metrology device 200a to the DUT 420.

In the illustrated example embodiment, the first sensor 314-1 may be a probe angle sensor for providing an associated output representative of the angle of the probe tip 208a relative to the surface to be measured 106, the second sensor 314-2 may be a pitch sensor for providing an associated output representative of the pitch $\Phi$ of the device 200a relative to the surface to be measured 106 and the third sensor 314-3 may be a roll sensor for providing an associated output representative of the roll $\alpha$ of the device 200a relative to the surface to be measured. Although the embodiment shown in FIG. 4 includes three sensors, any number of sensors may be used in a device consistent with the present disclosure for providing orientation error compensation. In some embodiments, for example, only one simple sensor, e.g. sensor 314-4, may be provided on the probe for identifying the probe angle $\theta$. In other embodiments only two sensors, e.g. sensors 314-1 and 314-2 or sensors 314-2 and 314-3 may be provided for determining probe angle $\theta$ and pitch $\Phi$, the pitch $\Phi$ and roll $\alpha$, etc. In some embodiments, more than three orientation sensors may be provided.

In some embodiments including only a single orientation sensor, the sensor 314-1 may be a simple potentiometer may be coupled to the pivot joint 410 connecting the probe tip 208a to the probe body 206a so that the resistance exhibited by the potentiometer changes as the probe tip 208a is rotated about the pivot joint 410. In embodiments wherein the device 200a can be oriented so that the pitch $\Phi$ of the device is zero degrees, e.g. in response to an alert indicating misalignment, the potentiometer may provide a direct output representative of the probe angle $\theta$ for use in compensating for a cosine error in orientation of the probe 204a to the surface to be measured 106.

Figure 5:
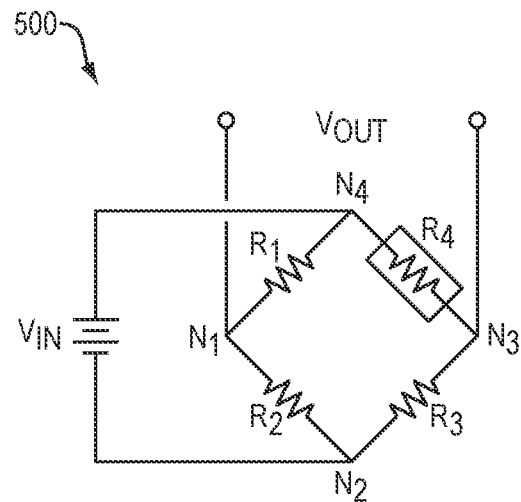
FIG. 5 is a circuit diagram showing one example of a circuit for providing a sensor output in an example of a metrology device consistent with the present disclosure.

A potentiometer may be combined in a variety of circuit configurations to provide an output representative of the probe angle $\theta$ or angle of the probe to the probe body. FIG. 5 shows one embodiment of such a circuit configuration including resistors R1, R2, R3 and R4. Resistor R4 may be a potentiometer coupled to the pivot joint 410 and resistors R1, R2, R3 and R4 may be coupled in a known Wheatstone bridge configuration with R1 and R2 coupled to a first node N1, R2 and R3 coupled to a second node N2, R3 and R4 coupled to a third node N3 and R4 and R1 coupled to a fourth node N4. An input voltage Vin from the battery 316 may be coupled between N4 and N2. As the resistance of R4 changes with rotation of the probe tip about the pivot joint 410, the output voltage Vout across nodes N1 and N3 changes correspondingly.

The voltage Vout can thus be used as a sensor output representative of the probe angle $\theta$ or the angle of the probe tip 208a relative to the probe body 206a. In some embodiments, the memory 306 may include a lookup table including a correction factor to be applied to the measurement indicated by the probe output to account for cosine error. The processor 302 may access the look up table in memory 306 and apply the correction factor associated with Vout. Table 1 below includes information that may be incorporated into a lookup table stored in memory 306 and accessed by the processor 302 to apply a correction factor associated with Vout:

TABLE 1

| R4 (KΩ) | Vout (mV) | Vth (V) | Probe Angle θ | Correction Factor |
|---|---|---|---|---|
| 10 | 2450 | 3.0-2.4 | 30 | .866 |
| 20 | 2000 | 2.3-2.0 | 20 | .940 |
| 30 | 1620 | 1.9-1.62 | 10 | .985 |
| 40 | 1290 | 1.52-1.29 | 0 | 1.0 |
| 50 | 1000 | 1.19-1.00 | −10 | .985 |
| 60 | 750 | 0.9-0.75 | −20 | .940 |
| 70 | 530 | 0.65-0.53 | −30 | .866 |

In Table 1, for example, if R4 is 10 KΩ, Vout may be 2450 mV. The processor 302 may convert Vout to a digital voltage value and any value in a threshold range (Vth) of 3.0-24 may be considered to correspond to a probe angle θ of 30 degrees, resulting in a correction factor of 0.866. The processor 302 would multiply the measurement indicated by the probe output by the correction factor (0.866 in this example) to display a measurement that has been automatically compensated for cosine error. Note that in Table 1, a value of Vout corresponding to a probe angle θ of 0 degrees results in a correction factor of 1.0, meaning there is no cosine error requiring compensation when the probe angle θ is 0 degrees in this example.

It is to be understood that Table 1 and the values therein describe only one example of a metrology device consistent with the present disclosure. A look-up table used in a system consistent with the present disclosure would be tailored to the type of metrology device, the number and types of orientation sensors used, etc. For example, a table used for plunger-type indicator may have a correction factor of 1.0 when the probe angle θ is perpendicular to the surface to be measured.

Calculation of a correction factor to compensate for orientation errors can be performed by the computing system 300 in a variety of ways. For example, in an embodiment including sensors 314-1, 314-2 and 314-3 for providing outputs representative of the probe angle θ, pitch Φ and the roll α of the device 200a relative to the surface to be measured 106 on the DUT 420, a compensation factor can be calculated mathematically. In some embodiments, the compensation factor may be calculated according to equation 1 below:

Compensation factor=cos($p+pa$)*cos($r$)=1/2*[cos($p+pa+r$)+cos($p+pa-r$)]   (Equation 1)

For example, in an embodiment wherein the orientation sensors indicate a roll α of 0 degrees, a pitch Φ of 5 degrees and a probe angle θ of 50 degrees, the compensation factor would calculate to 0.57357644 using equation 1. The measurement indicated by the probe output from the probe 204a would be multiplied by this compensation factor to display an accurate measurement that is automatically compensated for orientation errors.

In addition, or alternatively, a metrology device consistent with the present disclosure may be configured to alert the user that an orientation error exists, e.g. by an audible tone, voice message, and/or display. The alert may be provided in combination with automatic orientation error compensation or may be provided without automatic orientation error compensation to simply alert a user that the orientation of the device should be adjusted to obtain an accurate measurement. The device 200a may also be configured to select between modes of operation wherein one mode of operation provides only an alert that an orientation error exists without automatic compensation for the orientation error, another mode of operation provides only automatic compensation of orientation errors without an alert and another mode of operation provides both an alert and automatic compensation of orientation errors.

Figure 6:
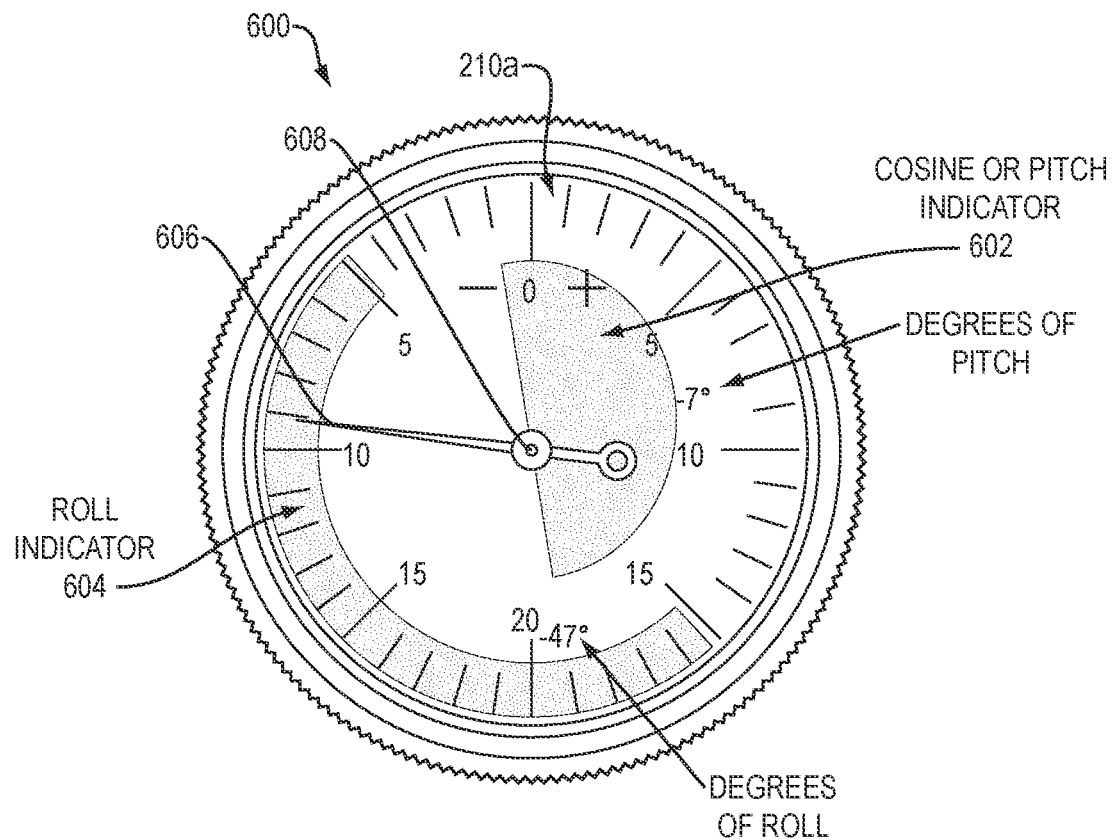
FIG. 6 illustrates one example of a display portion of a metrology device consistent with the present disclosure.

In embodiments where the alert regarding the existence of orientation errors is provided on the display 210, the display 210 may be configured in a variety of ways to display the alert. FIG. 6 illustrates one example 600 of a display 210a for a metrology device consistent with the present disclosure. In the illustrated embodiment, the display 210a is a digital display that replicates a circular analog gauge with a needle pointer 606 showing a measurement. The needle pointer 606 may point to a measurement value that has been automatically compensated for orientation errors, or that is uncompensated for orientation errors.

The display 210a also includes a cosine or pitch indicator 602 and a roll indicator 604. The cosine or pitch indicator 602 illustrates the pitch angle Φ of the device and is shown a semi-circular graphic positioned in the central area of the display. The cosine or pitch indicator may rotate about the central axis 608 of the display and the extent to which the cosine or pitch indicator rotates about the central axis 608 may indicate a value of the cosine or pitch angle Φ. A numerical representation of the cosine or pitch angle Φ may also be provided to show the degrees of pitch. In the illustrated embodiment, the degrees of pitch is shown as −7 degrees.

The roll indicator 604 illustrates the roll α of the device and is shown as bar graphic extending inward and around the outer perimeter of the display 210a. The extent to which the roll indicator extends around the perimeter of the display may indicate a value of the roll angle α. A numerical representation of the roll α angle may also be provided to show the degrees of roll α. In the illustrated embodiment, the degrees of roll α is shown as −47 degrees.

In embodiments consistent with the present disclosure, the display 210a may be a high-resolution display and the computing system 300 may be configured to provide real-time display of measured values compensated for orientation errors and/or to provide an alert as the existence of orientation errors and/or the extent of the orientation errors. The display 210a may include dynamic and scrollable menus and settings screens for the displayed data and/or the various ways in which the displayed is presented to the user. In some embodiments, the display 210a may include numeric values; actual, uncompensated measurements, measurements that have been automatically compensated for orientation errors, the amount of orientation error, etc.

Figure 7:
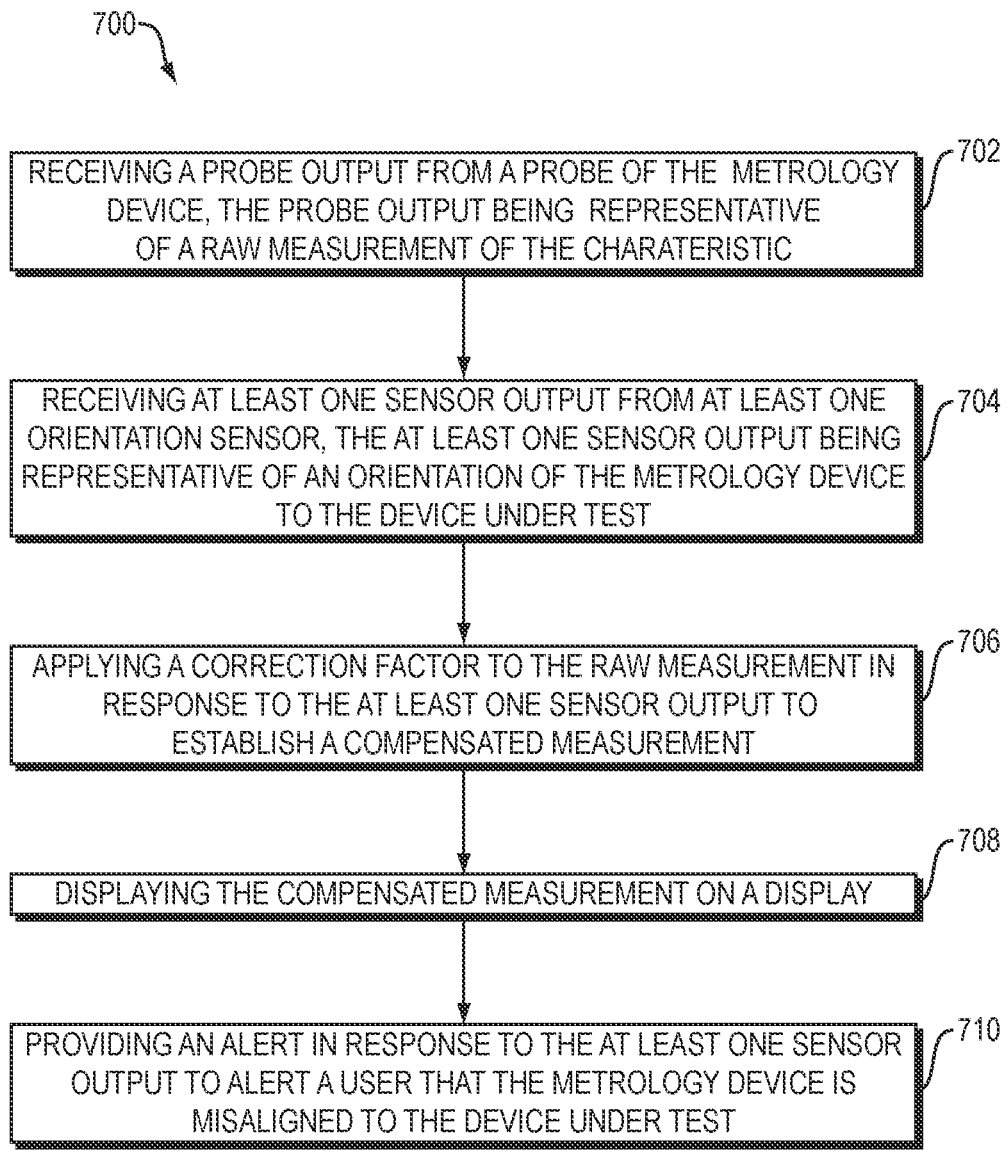
FIG. 7 is a flow chart illustrating an example of a method consistent with the present disclosure.

FIG. 7 is a flow chart illustrating a method 700 of measuring a characteristic of a DUT using a metrology device consistent with the present disclosure. Operation 702 includes receiving a probe output from a probe of the metrology device, the probe output being representative of a raw measurement of the characteristic, and operation 704 includes receiving at least one sensor output from at least one orientation sensor, the at least one sensor output being representative of an orientation of the metrology device to the DUT. In some embodiments, a correction factor is applied 706 to the raw measurement in response to the at least one sensor output to establish a compensated measurement, and the compensated measurement is displayed 708 on a display. In addition, or alternatively, an alert is provided 710 in response to the at least one sensor output to alert a user that the metrology device is misaligned to the DUT. While FIG. 7 illustrates various operations according to an exemplary embodiment, it is fully contemplated herein that in other embodiments of the present disclosure, the operations depicted in FIG. 7 and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure there is provided a metrology device including a housing; a processor disposed in the housing; a digital display; a probe, at least a portion of the probe being configured to move in response to a characteristic of a device under test and provide a probe output representative of raw measurement of the characteristic; and at least one orientation sensor, the at least one orientation sensor being configured to provide an associated sensor output representative of an orientation of the metrology device to the device under test. The processor is configured to receive the probe output and the associated sensor output and apply a correction factor to the raw measurement in response to the associated sensor output to establish a compensated measurement to compensate for misalignment of the metrology device to the device under test. The processor is also configured to provide an output to the digital display for providing a visual representation of the compensated measurement on the digital display.

According to another aspect of the disclosure there is provided a method of measuring a characteristic of a device under test using a metrology device, the method including: receiving a probe output from a probe of the metrology device, the probe output being representative of a raw measurement of the characteristic; receiving at least one sensor output from at least one orientation sensor, the at least one sensor output being representative of an orientation of the metrology device to the device under test; applying a correction factor to the raw measurement in response to the at least one sensor output to establish a compensated measurement; and displaying the compensated measurement on a display.

According to another aspect of the disclosure there is provided a metrology device including: a housing; a processor disposed in the housing; a probe, at least a portion of the probe being configured to move in response to a characteristic of a device under test; and at least one orientation sensor, the orientation being configured to provide an associated sensor output representative of an orientation of the metrology device to the device under test. The processor is configured to receive the associated sensor output and to provide an alert in response to the associated sensor output to alert a user indicating that the metrology device is misaligned to the device under test.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processor", may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A metrology device comprising:
   a portable hand-held housing;
   a memory disposed in the housing and configured to store an operating system;
   a processor disposed in the housing and configured to execute the operating system;
   a battery disposed in the housing and configured to supply electrical power to the processor;
   a probe coupled to the housing, at least a portion of the probe being configured to move in response to a characteristic of a device under test and provide a probe output representative of a measurement of the characteristic; and
   a digital display disposed in the housing and configured to provide a digital representation of a needle pointer on a digital representation of an analog gauge,
   the processor being configured to receive the probe output and provide an output to the digital display for causing the digital representation of the needle pointer to show a representation of the measurement of the characteristic of the device under test.

2. The metrology device according to claim 1, wherein the probe includes a probe body and a probe tip, the probe tip comprising a lever arm configured to rotate around a pivot joint with respect to the probe body.

3. The metrology device according to claim 1, wherein the probe includes a probe body and a plunger, the plunger configured to retract or extend from the prob body.

4. The metrology device according to claim 1, wherein the digital display is a touch screen display.

5. The metrology device according to claim 1, wherein the operating system is a mobile operating system.

6. A method of measuring a characteristic of a device under test using a hand-held metrology device, the method comprising:
   receiving a probe output from a probe of the metrology device, the probe output being representative of a measurement of the characteristic; and
   displaying, on a display of the hand-held metrology device, a digital representation of a needle pointer on a digital representation of an analog gauge, the digital representation of the needle pointer showing a representation of the measurement of the characteristic.

7. The method according to claim 6, wherein the probe includes a probe body and a probe tip, the probe tip comprising a lever arm configured to rotate around a pivot joint with respect to the probe body.

8. The method according to claim 6, wherein the probe includes a probe body and a plunger, the plunger configured to retract or extend from the prob body.

9. The method according to claim 6, wherein the digital display is a touch screen display.

* * * * *